Figure 3:
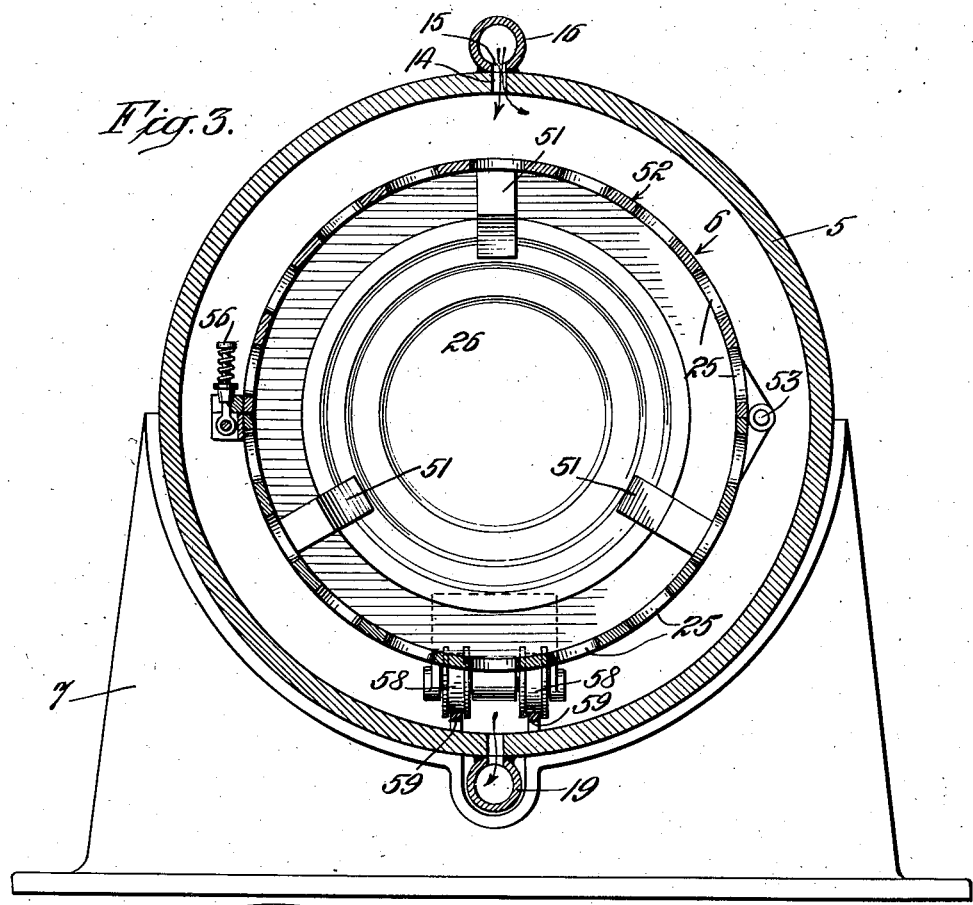

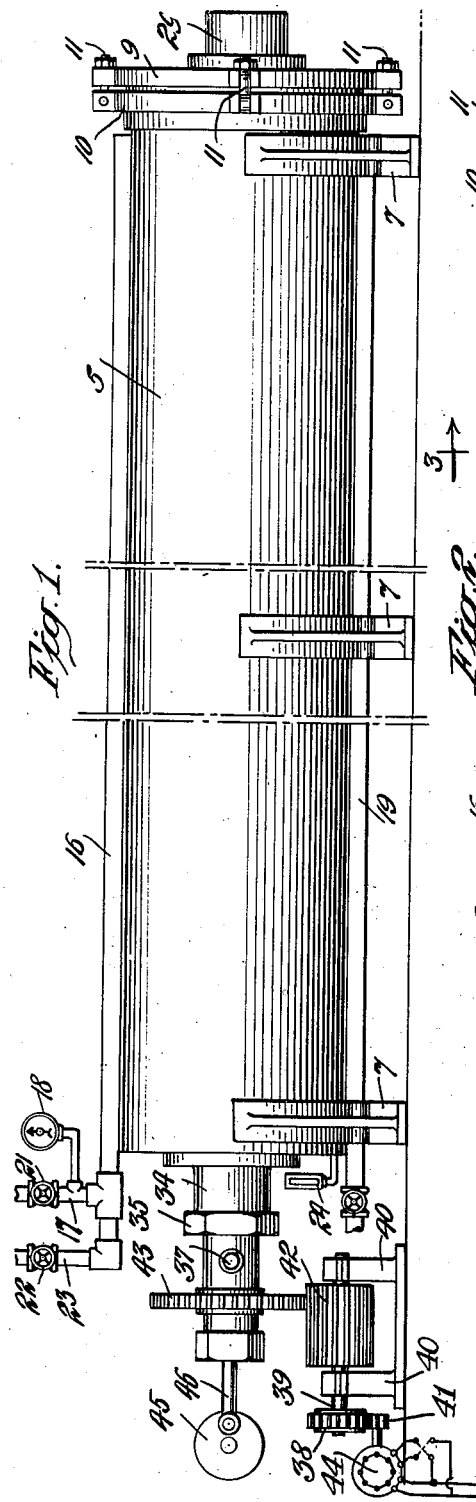

Dec. 1, 1936.   W. PAGE ET AL   2,062,331
METHOD OF TREATING CANNED LIQUIDS
Filed Sept. 6, 1935   2 Sheets-Sheet 2

INVENTORS
WALTER PAGE
BURT E. TAYLOR
BY English & Studwell
ATTORNEYS

Patented Dec. 1, 1936

2,062,331

UNITED STATES PATENT OFFICE 2,062,331

METHOD OF TREATING CANNED LIQUIDS

Walter Page, Scarsdale, and Burt E. Taylor, Mount Vernon, N. Y., assignors to The Borden Company, New York, N. Y., a corporation of New Jersey Application September 6, 1935, Serial No. 39,432

6 Claims. (Cl. 53—20)

The invention relates to an improvement in methods of treating canned liquids, and is more particularly an improvement in sterilizing or pasteurizing and then cooling preserved milk such as unsweetened, evaporated or condensed milk as distinguished from sweetened, evaporated or condensed milk, and other fluids preserved in the usual cylindrical tin cans, or cans of other shapes. The invention is also applicable to the treatment of raw fresh milk and other fluids such as fruit juices enclosed in cans and intended for early consumption after the canning and sterilizing or pasteurizing treatment. Although the invention is applicable to these various uses, for the sake of convenience it will be described in connection with the sterilizing of canned evaporated milk and the pasteurizing of canned raw milk, since these two processes are substantially identical, except in the temperatures employed and the length of time of the treatment.

Evaporated milk is usually enclosed in tin-lined cylindrical cans before it is sterilized. The process of sterilizing the evaporated milk must therefore be effected through the walls of the tin-lined metal can, so that a cooked flavor is often imparted to the milk which is found unpleasant by many people and prevents a more extensive sale and use of this convenient form of milk. Moreover, since the sterilizing heat is applied externally of the can it is obvious that the milk in the center of the cans does not receive the same heat treatment as that portion of the milk which contacts with or is near the inner surfaces of the cans, with the result that there is non-uniformity of taste, texture and color. Sometimes too that portion of the milk in contact with the inner surfaces of the metal walls of the cans absorbs a part of the tin coating of the cans. A slight metallic flavor is thus imparted to the milk, which is objectionable to some people.

In view of these conditions in the usual commercial methods of sterilizing canned evaporated milk, efforts have long been directed to agitating the cans during the sterilizing treatment in order to bring all portions of the contents of the cans into contact successively with the inner surfaces of the cans in order that the heat treatment thereof and the resulting sterilization may be uniform so as to produce a product of uniform texture and color and having as nearly as possible the taste of natural milk. These efforts have heretofore, however, not been crowned with complete success. The evaporated milk treated by the present commercial sterilizing methods can, when mixed with water to restore the milk to its normal fluidity, still be distinguished from raw or natural milk because of its cooked flavor and other indications of the methods employed in sterilizing it.

One object of the present invention is to provide a method of sterilizing evaporated milk and pasteurizing raw milk enclosed in containers by which the full natural flavor of the milk is retained and no cooked or metallic taste is imparted to the milk. In carrying out this improved method of sterilizing evaporated milk and pasteurizing raw milk, the milk enclosed in the containers is violently agitated, as by causing it to move rapidly centrifugally and endwise in the containers. This combined action is effected by rotating the containers on their longitudinal axes and preferably simultaneously reciprocating them, thereby constantly bringing fresh portions of the milk into contact with the inner surfaces of the containers. It will be understood in this connection that the walls of the containers will travel at a higher rate of speed than the liquid confined thereby, and so result in a constant shifting of the milk in the containers. Periodically the direction of rotation of the containers is suddenly reversed so as to secure a more intimate mixing of the contents of the containers and thereby more efficiently successively bring fresh portions thereof into contact with the inner surfaces of the containers. This action is further made more effective by reciprocating the containers during the rotation thereof. Since all portions of the milk or other liquid enclosed in the containers is constantly being brought into contact with and then immediately afterwards moved out of contact with the inner surfaces of the containers, it will be understood that higher sterilizing and pasteurizing temperatures can be employed without liability of cooking the solid contents of the liquid in contact with the walls of the containers, and also that the time heretofore required for sterilizing and pasteurizing can be substantially reduced.

Figure 4:
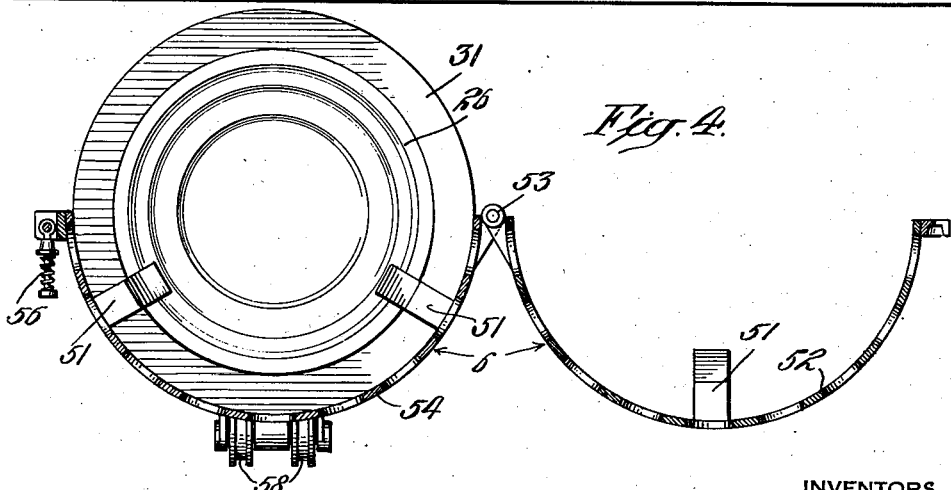

The preferred form of apparatus for practicing the improved method of sterilizing and pasteurizing milk or other fluids contained in cylindrical cans is illustrated in the accompanying drawings, in which Fig. 1 is a side elevation of an apparatus adapted both for sterilizing canned evaporated milk and pasteurizing canned raw milk; Fig. 2 is a longitudinal vertical section of the apparatus shown in Fig. 1, on a slightly enlarged scale; Fig. 3 is a transverse section taken on the line 3—3 of Fig. 2, but on an enlarged scale; and Fig. 4 is an end elevation of one of the cylindrical containers held in position in the perforated drum, but with the hinged section of the drum thrown back so that the container may be placed therein for treatment and afterwards removed therefrom.

The sterilizing and pasteurizing apparatus illustrated in the drawings comprises essentially two parts, a stationary longitudinally-arranged cylindrical shell or chamber 5, and a cylindrical can-holding drum 6 located axially within the chamber 5 and arranged to rotate and move axially within the chamber. The chamber 5 is supported by the standards 7 the upper ends of which are semi-circular in shape in order to closely embrace the lower portion of the cylindrical chamber, as shown in Fig. 3. One end of the chamber is closed by the head 8 and the other end is closed by a disk-like door or cover 9 removably secured to the flange-like portion 10 of the chamber by means of the hinged bolts 11. The inner side of the cover 9 is provided with a circular rib 12 which presses against a circular gasket 13 in the flange.

The fluid medium for treating the contents of the cans held in the drum 6 enters the interior of the chamber 5 through the holes 14 in the top side thereof which aline with the holes 15 in the lower side of a pipe 16 secured longitudinally along the top of the outer surface of the chamber. The sterilizing and pasteurizing is preferably effected by steam which enters the pipe 16 from the valve controlled pipe 17 provided with a gage 18. The condensate gathering in the bottom of the chamber 5 passes into the valve-controlled pipe 19. Upon the completion of the sterilizing or the pasteurizing operation, the valve 21 in the pipe 17 is closed, and the valve 22 in the pipe 23 is opened to permit cold water or other cooling medium to pass through the chamber 5 and out through the pipe 19 in order to bring the temperature of the contents of the cans in the drum 6 to the desired degree. The chamber 5 is provided with the thermometer 24 in the lower part thereof to indicate the temperature of the condensate and water.

The cylindrical shell of the drum 6 is pierced throughout its entire cylindrical portion with the holes or perforations 25 to permit the treating fluid to have access directly to the outer surfaces of the series of cans 26 held in the drum. One end of the drum is closed by the head 27 provided with the trunnion 28 which is journalled in the boss 29 extending axially outwardly from the chamber head or cover 9 and closed at its outer end. The other end of the drum 6 is closed by the head 31 provided with the elongated trunnion 32 which is received within a sleeve 33 journalled in the bearing 34 secured to the head 8 of the chamber 5. Leakage between the sleeve 33 and bearing 34 is prevented by a gland 35 of usual arrangement. The outer end of the trunnion 32 is secured to the sleeve 33 by means of a bolt 37 so that rotary and reciprocatory movements may be imparted to the drum 6. The drum is rotated by means of a gear 38 mounted on the outer end of the shaft 39 supported in the uprights 40. On the shaft 39 is mounted an elongated pinion 42 which engages with and drives a gear 43 fixed on the outer solid end of the sleeve 33. The gear 38 is driven by a pinion 41 actuated by a reversing motor of conventional type, generally indicated by the reference numeral 44. The reciprocatory or shaking movements are imparted to the drum 6 by means of a crank construction 45, the crank rod 46 of which is provided on its outer end with a ball 47 which is held against the recessed outer end of the solid portion of the sleeve 33 by means of a threaded cap 48. The elongated pinion 42 permits the gear 43 to travel longitudinally under the action of the crank 45 while rotating the drum 6. To avoid the compression of air in the bearing portion 29 of the cover 9 of the chamber 5 a passageway 49 leads from the closed outer end of the bearing 29 into the interior of the chamber 5.

In order that the sterilizing and pasteurizing treatment of the milk or other liquid contained in the cans 26 may be most efficiently performed, it is necessary that there be no lag or lost motion between the cans and the drum 6, in other words, that the cans be positively held and driven by the drum. To this end the inner surfaces of the drum at uniform intervals, depending upon the length of the cans under treatment, are provided with the wedge-shaped pieces 51 which point radially inwardly and are arranged to press against the rims of the ends of the cans, as shown in Figs. 2, 3 and 4. The wedge-shaped canholding pieces 51 are conveniently arranged in groups of three throughout the length of the apparatus which can be constructed to hold any convenient number of cans arranged axially in a single line, depending upon mechanical considerations and upon the diameter of the cans. The cans are placed in the drum 6 when the latter is removed from the chamber 5 and the hinged section 52 is swung outwardly on its hinge 53, as shown in Fig. 4. When the section 54 of the drum has been filled to capacity with cans the section 52 thereof is closed down on the cans and the two sections are held together by the spring bolts 56. It will be observed that the section 54 of the drum is provided with two wedge-shaped pieces 51 and that the section 52 of the drum is provided with a single wedge-shaped piece 51, which when the section 52 is in closed position, as shown in Fig. 3, is located radially half-way between the two wedge-shaped pieces 51 in the drum section 54 which initially receive the cans (while the drum is in charged position, as shown in Figs. 4 and 3) and hold them in position until the wedge-shaped piece 51 of the drum section 52 is brought down against the upper edges of the ends of the cans to hold them firmly during the rotating and axial movements thereof.

The inner end of the drum 6 is provided with two wheels 58 which are arranged to travel on the tracks 59 located in the bottom of the chamber 5 when the drum 6 is moved into and withdrawn from the chamber 5. By reference to Fig. 2, it will be observed that when the drum 6 is in operative position within the chamber 5 the wheels 58 clear the inner ends of the tracks 59 so as not to interfere with the rotation of the drum at any axial position within the chamber 5. The bolt 37 is so arranged with relation to the wheels 58 that when it is in vertical position the wheels 58 aline with the tracks 59, thereby facilitating the withdrawal of the drum 6 from the chamber 5 when the bolt 37 is disconnected from the trunnion 32 and sleeve 33 and the cover 9 removed from the outer end of the chamber 5. The reassemblage of the various parts of the apparatus is easily effected, because when the wheels 58 are placed on the tracks 59 in inserting the drum into the chamber 5 the holes in the trunnion 32 and the sleeve 33 come into alinement when the drum 6 has been pushed inwardly until the outer end of the trunnion 32 bears against the solid portion of the outer end of the sleeve 33. The cover 9 is readily placed in position by sliding the journal hole in the bearing 29 over the trunnion 28 and then swinging the bolts 11 into their slots in the periphery of the cover 9.

When the apparatus is put into the condition just described, which is illustrated in Fig. 2, the cans are ready for the sterilizing or pasteurizing treatment. For the sterilizing treatment it is assumed that the cans contain unsweetened evaporated milk. The function of the sterilization is to destroy the micro-organisms contained in the milk which in time may prove deleterious to the milk. Now these micro-organisms can be destroyed at varying temperatures held for varying lengths of time. The lower the temperature employed the longer is the time required to destroy the micro-organisms, and conversely, the higher the temperature employed, the shorter will be the time required for the sterilization. In the former methods of sterilizing evaporated milk it has not been feasible to use the higher temperatures, say those ranging up to 260° F. because of the liability of cooking or scorching the casein and other solid contents of that portion of the milk in direct contact with the inner surfaces of the cans and thereby imparting a granular texture and the cooked taste to the milk which many people find objectionable. According to the present invention, on the contrary, it is feasible to employ the higher ranges of sterilizing temperatures because no portions of the evaporated milk are in contact with the inner surfaces of the cans long enough to permit the casein and other solids of the milk to be cooked, and consequently, the objectionable cooked taste cannot be imparted to the milk. The range of speed at which the drum 6 and the cans held thereby may be rotated varies widely, but with satisfactory sterilization results at various speeds. For example, a speed of 200 to 300 revolutions per minute gives satisfactory results in sterilizing with temperatures up to about 248° F., whereas by employing speeds ranging up to about 1500 revolutions per minute a sterilizing temperature of 260° F. may be used, and the time required with such speeds and such temperatures for complete sterilization is not more than five minutes, a period considerably less than that required at the present time employing sterilizing temperatures of from about 232° F. to about 248° F. The rate of reciprocation is preferably proportionate or comparable to the speed of rotation, and may range from about 25 reciprocations per minute to about 75 reciprocations per minute, and even higher.

Pasteurization of raw milk may be effected at temperatures of about 143° to 145° F., but at these temperatures the time required is about 30 minutes. If temperatures of about 160° to about 165° F. are employed satisfactory pasteurization can be effected in less than a minute. By imparting the centrifugal and reciprocatory movements to the raw milk according to the principles of the present invention a higher temperature than even 165° F. may be employed at a correspondingly reduced period required for effective pasteurization.

Not only must the sterilization and pasteurizing be effected so that all portions of the milk or other liquid are constantly brought momentarily into contact with the inner surfaces of the can so as to avoid imparting a cooked flavor thereto and so that a uniform smooth texture and natural taste will be present in all portions of the milk, but it is also necessary for this latter result that the cooling of the milk or other fluid be effected under the same conditions. Accordingly, when the valve 21 is closed in the steam pipe 17, and the valve 22 is opened in the cold water pipe 23, the drum 6 continues to rotate, first in one direction and then in the opposite direction, the reverse direction of rotation being periodic, and the reciprocatory motion is still imparted to the drum and the cans held thereby while the cold water cools the contents of the cans down to the required degree, so that the cooling is effected uniformly throughout the contents of the cans.

By sterilizing and cooling canned evaporated milk in practising the present invention, a product results which has a smooth uniform texture free from granules of cooked solid ingredients of the milk and a taste or flavor closely approaching that of natural milk. Raw canned milk pasteurized according to the present invention is almost if not entirely free from the cooked flavor now commonly noticed in pasteurized milk. By violently agitating the evaporated milk during the sterilization thereof, it is not necessary to shake the cans on the completion of the sterilizing treatment, which is the usual practice in the present commercial sterilizing methods.

Having thus described the invention, what we claim as new is:—

1. The method of treating liquids enclosed in containers held against movement in directions transverse to the axes of the containers, which consists in rotating the containers on their axes to impart a centrifugal and rotary movement to their contents within the containers while subjecting the containers externally to heating and cooling media successively.

2. The method of treating liquids enclosed in containers held against movement in directions transverse to the axes of the containers, which consists in rotating the containers on their longitudinal axes to impart a centrifugal and rotary movement to their contents within the containers, periodically reversing the direction of rotation of the containers, reciprocating the containers during their rotation, and subjecting the containers externally to heating and cooling media successively.

3. The method of treating liquids enclosed in cylindrical containers held against movement in directions transverse to the axes of the containers, which consists in rotating the containers on their longitudinal axes to impart a centrifugal and rotary movement to their contents within the containers, periodically reversing the direction of rotation of the containers, and subjecting the containers externally to heating and cooling media successively.

4. The method of successively sterilizing and cooling liquids contained in cylindrical cans held against movement in directions transverse to the axes of the cans, which consists in imparting to the liquid a centrifugal, rotary and reciprocatory movement within the cans so as to constantly bring different portions of the liquid into contact with the inner surfaces of the cans, and applying sterilizing and cooling media successively to the outer surfaces of the cans.

5. The method of successively sterilizing or pasteurizing and cooling milk contained in cylindrical cans held against movement in directions transverse to the axes of the containers, which consists in imparting to the milk a centrifugal and rotary movement in one direction for a predetermined period of time, and periodically reversing the direction of the centrifugal and rotary movement of the milk, while successively applying sterilizing or pasteurizing and cooling media to the outer surfaces of the cans.

6. The method of sterilizing evaporated milk contained in a cylindrical can held against movement in directions transverse to the axis of the can which consists in rapidly rotating the can on its longitudinal axis in one direction to impart a centrifugal and rotary movement to the milk within the can, periodically reversing the direction of rotation of the can to impart a centrifugal and rotary movement to the milk in the opposite direction, repeating these steps until the sterilization of the milk is effected, reciprocating the can during the rotation thereof to shake the milk, applying a sterilizing medium to the can externally, and then cooling the can and its contents.

WALTER PAGE.
BURT E. TAYLOR.